UNITED STATES PATENT OFFICE.

WILLIAM HARVEY, OF WATERVILLE, ASSIGNOR OF ONE-HALF HIS RIGHT TO SAMUEL FINN, OF UTICA, NEW YORK.

IMPROVEMENT IN CLEANING AND PURIFYING BEER-BARRELS.

Specification forming part of Letters Patent No. 125,193, dated April 2, 1872.

Specification describing a new and Improved Process of Cleansing and Purifying Musty Beer-Barrels, invented by WILLIAM HARVEY, of Waterville, in the county of Oneida and State of New York.

Take two pounds of the inside bark of white oak crushed or pulverized, and known in the dispensatory as quercitron. Put the same into any musty barrel intended to be cleansed, and pour upon it enough of hot water to fill it about one-half full. Set the barrel upon one end; let it stand and the bark steep for two hours; then reverse the barrel and let it stand the same time upon the other end; or, as the water grows colder, it may require to stand longer; also the barrel may be occasionally a little shaken or agitated; then pour off the water, take out the bark, and the barrel will be found pure and free from all musty odor. The same charge may generally be used in like manner to cleanse another barrel; and if the barrels are not very badly affected some three or four may be thus successfully treated with the same bark and water. If, however, the barrel is very badly affected, sometimes it requires three or four pounds of the bark to cleanse it; but a sufficient amount will never fail of the desired effect. If by this process a barrel sometimes becomes slightly infected with the taste or odor of the bark, such infection may be entirely removed by merely rinsing or soaking the interior of the barrel with pure water. Instead of first putting the bark into the barrel and then pouring the water upon the same, the bark may be first boiled or steeped in water and then the water poured into the barrel. By this process there is less difficulty experienced in removing finally the particles of bark from the barrels. But the process first described is the one generally preferred. Musty beer-barels may thus be rendered as clean and pure as if entirely new.

I claim as my invention—

The process of cleansing and purifying musty beer-barrels by the use of a decoction of the inside bark of white oak steeped in water substantially as described.

WILLIAM HARVEY.

Witnesses:
   BRAZILL DEMING,
   CHARLES LATHAM.